United States Patent

Matsui et al.

(10) Patent No.: US 6,986,827 B2
(45) Date of Patent: Jan. 17, 2006

(54) METHOD FOR BONDING NON-MAGNETIC MEMBERS

(75) Inventors: Nobuo Matsui, Saitama-ken (JP);
Keiichi Sato, Saitama-ken (JP); Yuki Kasahara, Saitama-ken (JP); Makoto Nasu, Saitama-ken (JP)

(73) Assignee: Honda Giken Kogyo Kabushiki Kaisha, Tokyo (JP)

(*) Notice: Subject to any disclaimer, the term of this patent is extended or adjusted under 35 U.S.C. 154(b) by 174 days.

(21) Appl. No.: 09/933,832

(22) Filed: Aug. 22, 2001

(65) Prior Publication Data

US 2002/0029847 A1 Mar. 14, 2002

(30) Foreign Application Priority Data

Aug. 23, 2000 (JP) ........................... 2000-253053

(51) Int. Cl.
*C09J 5/10* (2006.01)

(52) U.S. Cl. ............... 156/306.9; 156/228; 156/272.2; 156/323; 269/8

(58) Field of Classification Search ............ 156/272.2, 156/273.3, 306.6, 306.9, 307.1, 323, 273.5, 156/228, 580, 588.1; 296/274, 275, 8, 276
See application file for complete search history.

(56) References Cited

U.S. PATENT DOCUMENTS

| 1,782,615 | A | * | 11/1930 | Hopwood | 269/98 |
| 2,519,107 | A | * | 8/1950 | Brown | 269/275 |
| 2,552,285 | A | | 5/1951 | Knewstubb et al. | |
| 2,705,084 | A | * | 3/1955 | Willfond | 410/34 |
| 2,713,379 | A | * | 7/1955 | Sisson | 269/8 |
| 3,935,055 | A | * | 1/1976 | Carmien | 156/443 |
| 4,335,873 | A | * | 6/1982 | Kiefer | 269/228 |
| 4,478,659 | A | | 10/1984 | Hall | |

FOREIGN PATENT DOCUMENTS

| DE | 38 27 178 C | 3/1990 |
| DE | 41 26 009 A1 | 2/1993 |
| DE | 196 07 061 C1 | 5/1997 |
| JP | 10-264257 | 10/1998 |

\* cited by examiner

*Primary Examiner*—Jeff H. Aftergut
*Assistant Examiner*—John L. Goff
(74) *Attorney, Agent, or Firm*—Sughrue Mion, PLLC

(57) ABSTRACT

A method for bonding a plurality of non-magnetic members includes the steps of (1) mating the non-magnetic members via an uncured adhesive interposed between their surfaces to be bonded; (2) applying pressure to their mated portions between a pressing magnet jig and a pressure-receiving, soft-magnetic jig; and (3) curing the adhesive while applying pressure.

12 Claims, 2 Drawing Sheets

METHOD FOR BONDING NON-MAGNETIC MEMBERS

FIELD OF THE INVENTION

The present invention relates to a method for bonding a plurality of non-magnetic members.

BACKGROUND OF THE INVENTION

From the viewpoint of global environmental protection and energy saving, it has recently been desired to reduce the weight of transport vehicles such as aircraft, automobiles, etc. It has accordingly been studied to use aluminum alloys and/or fiber-reinforced composite materials as materials for their main constituent members. There has been a remarkable progress particularly in the development of fiber-reinforced composite materials for members required to have high strength, corrosion resistance and oil resistance as well as reduced weight.

Because aluminum alloy members are conventionally joined to each other by arc-welding, their portions to be welded should be formed thick to have sufficient strength, failing to sufficiently reduce weight. Further, with disadvantages inherent in arc welding, welded portions sometimes need be chipped and welded again, requiring considerable man-hours. Further, since high-strength aluminum alloys used for the members of aircraft, etc. are poor in weldability, rivets are used, resulting in increase in the weight and cost of the members. Therefore, a simple method for bonding aluminum alloy members are desired to reduce the weight of bonded members and man-hours necessary therefor.

Further, when fiber-reinforced composite material members are bonded to each other or to aluminum alloy members, they cannot be bonded by welding, necessitating bonding with an adhesive. For example, Japanese Unexamined Patent Publication No. 10-264257 discloses a method for forming an integral fiber-reinforced composite material member using uncured prepregs as bonding materials.

However, to bond these non-magnetic members together, their mated portions should be pressed, and particularly when bonding large-size, non-magnetic members, a whole structure of the non-magnetic members should be fixed with a large-size metal jig and fastened by bolts, rivets, clamps, etc. For this reason, it is necessary to make a large number of through-holes in the non-magnetic members, into which bolts, etc. are inserted, remove the bolts, etc. after an adhesive is cured and then cover the through-holes with protective materials. This increases the manufacturing cost because it requires large-size jigs and considerable man-hours.

OBJECT OF THE INVENTION

Therefore, an object of the present invention is to provide a method for bonding a plurality of non-magnetic members of the same or different types such as aluminum alloy members and fiber-reinforced composite material members by few man-hours with high efficiency.

SUMMARY OF THE INVENTION

As a result of research in view of the above object, the inventors have found that the above problem in bonding a plurality of non-magnetic members can be solved by mating a plurality of non-magnetic members via an uncured adhesive and by curing the adhesive while applying pressure to their mated portions between a pressing magnet jig and a pressure-receiving, soft-magnetic jig. The present invention has been completed based on this finding.

Thus, the method for bonding a plurality of non-magnetic members in accordance with the present invention comprises the steps of:

(1) mating the non-magnetic members via an uncured adhesive interposed between the bonding surfaces of the respective mated portions of the non-magnetic members;

(2) applying pressure to the mated portions between a pressing magnet jig and a pressure-receiving, soft-magnetic jig; and (3) curing the adhesive while applying pressure.

The adhesive is preferably a thermosetting adhesive in the form of sheet. A cushioning member is interposed between the pressing surface of the pressing jig made of the magnet and the outside surface of the portion to be bonded of the non-magnetic member.

The non-magnetic member is preferably made of a fiber-reinforced composite material.

The method for bonding non-magnetic members in accordance with the present invention can be applied to bonding half-cylindrical skin members made of a fiber-reinforced composite material and constituting the fuselage of aircraft.

DESCRIPTION OF THE PREFERRED EMBODIMENTS

A method for bonding a plurality of non-magnetic members in accordance with the present invention comprises the steps of:

(1) mating the non-magnetic members via an uncured adhesive interposed between their surfaces to be bonded;

(2) applying pressure to the mated portions of the non-magnetic members between a pressing magnet jig and a pressure-receiving, soft-magnetic jig; and (3) curing the adhesive while applying pressure.

The non-magnetic members are desirably made of light-weight materials of the same or different types such as fiber-reinforced composite materials, aluminum alloys, etc. Though not restrictive, the non-magnetic members may be in the shapes of panel, pipe, box or combinations thereof. It is recommended that the fiber-reinforced composite material be made by impregnating reinforcing fibers such as carbon fibers, glass fibers, aramide fibers, etc. with synthetic resins (for example, polyesters, epoxy resins, bismalimide resins, phenolic resins, melamine resins, or silicon resins) and curing them.

Figure 1:
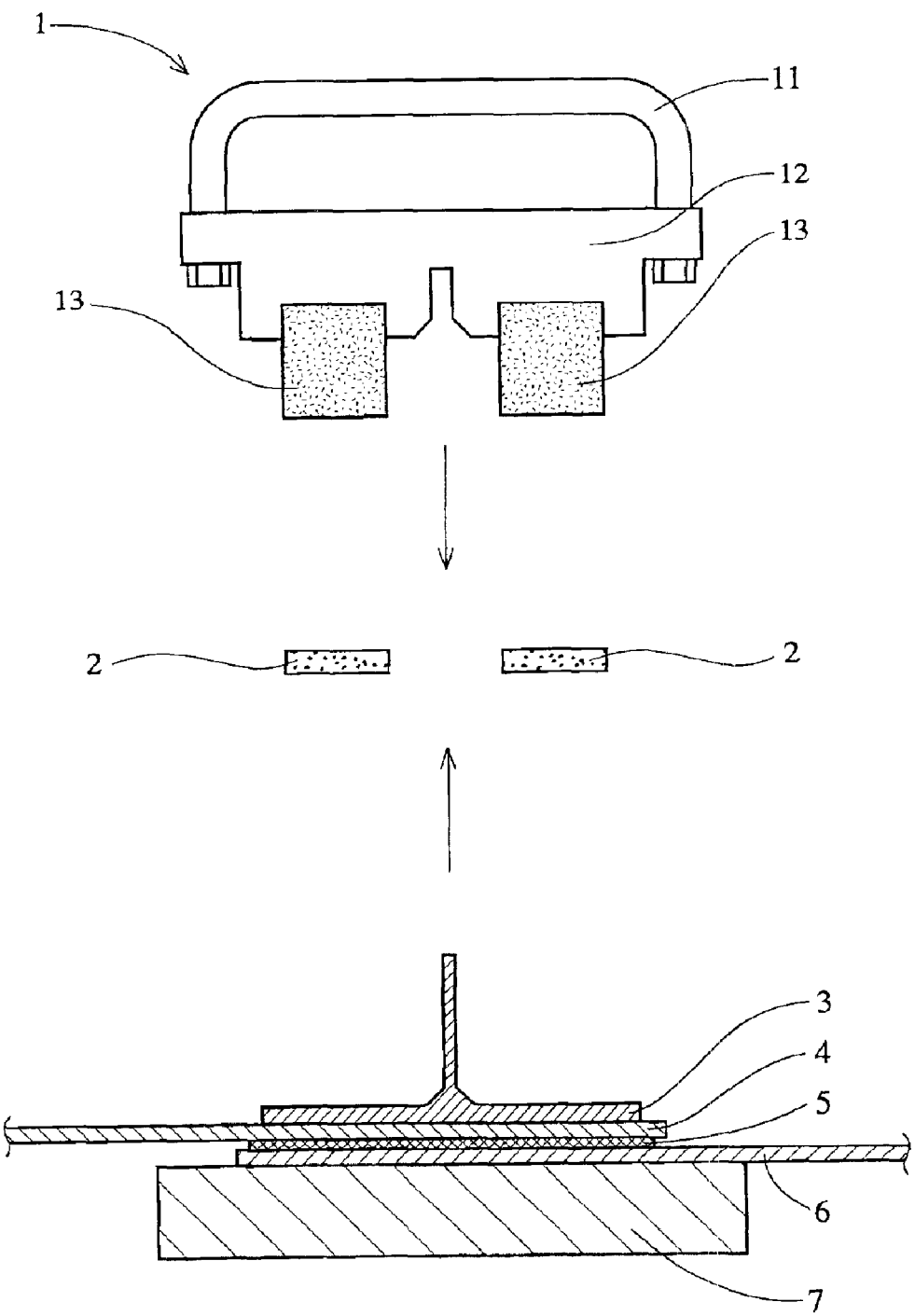
FIG. 1 is a schematic view showing a state where a pressing magnet jig is contact with the mated portions of half-cylindrical skin portions by a method for bonding non-magnetic members in accordance with the present invention.
Figure 2:
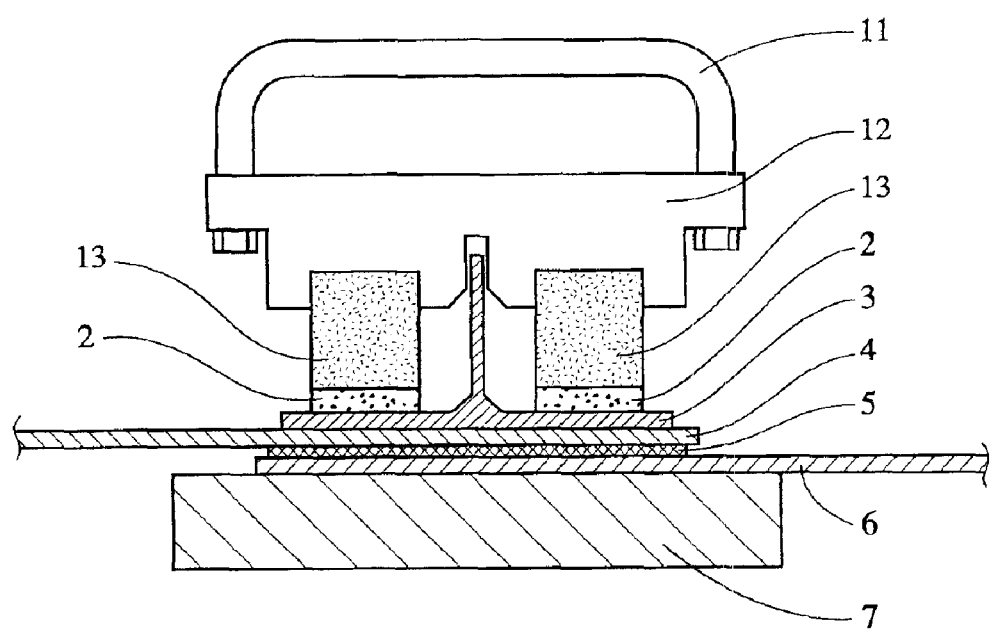
FIG. 2 is a schematic view showing a state where the mated portions of half-cylindrical skin portions are pressed by a method for bonding non-magnetic members in accordance with the present invention.

The bonding of the fiber-reinforced composite structures using a pressing magnet jig will hereinafter be described in detail with reference to the accompanying drawings. FIGS. 1 and 2 show an embodiment in which half-cylindrical skin members made of a fiber-reinforced composite material for constituting a fuselage of aircraft are bonded to each other. The pressing magnet jig 1 comprises a handle 11 made of a soft-magnetic material, a jig body 12 made of a soft-magnetic material, and magnet members 13. A reference numeral 7 denotes a pressure-receiving, soft-magnetic jig pairing with the pressing magnet jig 1. The reference numerals 4 and 6 denote half-cylindrical skin members, which are mated with each other via an adhesive sheet 5. It should be noted that the shapes of the portions to be bonded are not limited to this embodiment, and that the portions to be bonded may be in any other shapes.

(1) Mating of half-cylindrical skin members with uncured adhesive sheet therebetween Two half-cylindrical skin members 4 and 6 are mated with each other with an uncured adhesive sheet 5 between their mated portions. The number of the uncured adhesive sheets inserted between the mated portions is preferably selected depending on a gap of the mated portions, though one adhesive sheet is usually preferable. An excessive number of uncured adhesive sheets are not preferable because they degrade the accuracy of dimension when assembling the half-cylindrical skin members 4 and 6.

Though not restrictive, an adhesive is preferably used for bonding the structural members of aircraft, because the adhesive slightly creeps when a large load is applied thereto and has resistance to heat and solvent such as water, oil, gasoline, etc. The adhesive is preferably of a thermosetting type such as a thermosetting epoxy-based, phenol-based, or resorcinol-based adhesive, and this adhesive may be mixed with synthetic rubbers or thermoplastic resins.

Although the adhesive may be applied in the form of liquid, it is applied preferably in the form of sheet. When this kind of thermosetting adhesive or adhesive sheet is used, it preferably has a curing temperature lower than the heat resistance temperature of a magnet. For example, AF163-2K (curing temperature: 120° C.) available from Minnesota Mining and Manufacturing Co. of the U.S., and FM300-2 (curing temperature: 120° C. to 180° C.) available from Cytec Fiberite Co. of the U.S. may be preferably used.

(2) Applying pressure to mated portions between pressing magnet jig and pressure-receiving, soft-magnetic jig The mated portions of the half-cylindrical skin members are sandwiched by the pressing magnet jig 1 and the pressure-receiving, soft-magnetic jig 7 and pressed therebetween by an attractive force of the magnet in the pressing jig 1 to the soft-magnetic member in the pressure-receiving jig 7.

First, the pressure-receiving, soft-magnetic jig 7 is put into contact with the outside surface of the portion to be bonded of the half-cylindrical skin member 6. Preferably, the surface of pressure-receiving, soft-magnetic jig 7 is shaped at least along the outside surface of the portion to be bonded of the half-cylindrical skin member 6. Next, the pressing magnet jig 1 paring with the pressure-receiving, soft-magnetic jig 7 is put into contact with the outside surface of the portion to be bonded. Preferably, the pressure-applying surface of the pressing magnet jig 1 is shaped at least along the outside surface of the portion to be bonded of the half-cylindrical skin member 4.

Instead of the pressure-receiving, soft-magnetic jig 7, another pressing magnet jig 1 may be used to generate an attractive force between both pressing magnet jigs.

The size and magnetic force of the magnet are selected such that it applies pressure of 0.025 kg/cm$^2$ to 0.8 kg/cm$^2$, more preferably 0.2 kg/cm$^2$ to 0.6 kg/cm$^2$ to the mated portions, depending on the thickness and area of the mated portions and the type of the non-magnetic material. If pressure is less than 0.025 kg/cm$^2$, a bonding force becomes too smaller because the bonding surfaces are not put into uniform contact with the adhesive sheet, resulting in a likelihood that the pressing magnet jig 1 and the pressure-receiving, soft-magnetic jig 7 may be detached by their own weights. Although the upper limit of pressure is not restrictive, pressure larger than 0.8 kg/cm$^2$ makes it difficult to detach the jigs, while saturating increase in bonding strength.

The magnet is preferably a permanent magnet from the viewpoint of workability. Further, in the case of using a thermosetting adhesive, it is preferable that the heat resistance temperature of the magnet is not less than 130° C.

Preferable as a magnet satisfying such requirements is NEOMAX-30SH (heat resistance temperature: 140° C.) available from Sumitomo Special Metals Co. Ltd. The jig body 12 made of a soft-magnetic material and the handle 11 is preferably attached to a pair of magnets 13 as shown in FIG. 1 to easily handle the magnets 13. FIG. 2 shows a soft-magnetic jig body 12 utilizing the shape of a stringer portion 3 made of a fiber-reinforced composite material to determine a bonding position. It should be noted that the shapes of the magnet and the soft-magnetic jig are not limited to those exemplified, and that they may be in any other shapes.

To make the magnet form a circumferential magnetic path and to apply pressure to the whole bonding surface, a pair of permanent magnets are preferably fixed to the soft-magnetic jig with their magnetic poles opposed as is shown by the reference number 13 in FIGS. 1 and 2.

To facilitate the detachment of the pressing magnet jig 1 from the bonded members and to improve the conformability of the pressing jig 1 to the shape of the portion to be bonded, one or more cushioning members 2 are preferably interposed between the pressing surface of the pressing magnet jig 1 and the outside surface of the mated portion of the half-cylindrical skin member 6. A silicone or tetrafluorocarbon sheet is preferably used as the cushioning member 2. Although the thickness of the cushioning member 2 is not limited to a specific one, it is preferably 1 mm to 3 mm. In the case of using the cushioning member 2, the magnetic force of the magnet is preferably selected such that pressure ranges from 0.025 kgf/mm$^2$ to 0.8 kgf/mm$^2$ in a state where the cushioning member 2 is interposed.

Fastening members such as pins, bolts and nuts, rivets, sheet clamps for determining a bonding position are preferably used in minimum numbers before the pressing magnet jig 1 abuts the pressure-receiving, soft-magnetic jig 7 via the non-magnetic members to be bonded. However, the use of an excessive number of pins, etc. should be avoided because it increases the man-hours.

(3) Curing adhesive sheet while applying pressure

As shown in FIG. 2, the thermosetting adhesive sheet 5 is heated to a temperature necessary for curing while applying pressure to the mated portions. A heating unit is not restrictive. Though the mated portions may be locally heated with hot air, etc., the local heating of the mated portions may result in the breakage of the fiber-reinforced composite members or their mated portions by thermal expansion in some cases. Thus, it is preferable to heat the entire fiber-reinforced composite members uniformly using a uniform-temperature furnace. The heating temperature need only be lower than the heat resistance temperature of the magnet and high enough to thermally cure the adhesive sheet, though it preferably ranges from 100° C. to 130° C., more preferably from 110° C. to 120° C. If the heating temperature is lower than 110° C., the curing of the adhesive sheet is not complete, failing to produce sufficient bonding strength.

The bonding surfaces need only be heated while applying pressure for a time necessary for fully curing the adhesive to sufficient bonding strength, though it is preferable to keep them at the heating temperature for about 60 minutes. In the case of large fiber-reinforced composite members, their heating and cooling may be carried out at a constant speed of 2–4° C./minute.

When pins, etc. are used to position the mated portions, they may be removed from the portions bonded or may be left as they are, after the mated portions are bonded. In the case of removing the pins, the hole from which the pins are removed are covered with resins, etc. On the other hand, when the pins are left, the pins are covered with the same material described above to prevent the corrosion of the pins.

While the method for bonding non-magnetic members in accordance with the present invention has been described with reference to the drawings, it should be noted that the present invention is not limited thereto. On the contrary, the present invention is intended to cover all alternatives, modifications and equivalents, which may be included within the scope of the invention defined by the claims appended hereto.

As described above in detail, according to the method in accordance with present invention, it is possible to effectively bond a plurality of non-magnetic members by few man-hours.

What is claimed is:

1. A method for bonding a plurality of non-magnetic members comprising the steps of:
   (1) mating non-magnetic members via an uncured adhesive interposed between their surfaces to be bonded;
   (2) applying pressure to the mated portions of said non-magnetic members between a pressing magnet jig and a pressure-receiving, soft-magnetic jig; and
   (3) curing said adhesive while applying pressure, wherein a cushioning member is interposed only on a single side of said mated portions of said non-magnetic members between a pressing surface of said pressing magnet jig and outside surfaces of the mated portions of said non-magnetic members so as to subject the whole bonding surfaces to contacting uniformly with said adhesive, and wherein said cushioning member comprises two separate parts each interposed on the single side of the mated portions of the non-magnetic member between the pressing surface of the pressing magnetic jig and the outside surfaces of the mated portions of the non-magnetic members, said two separate parts being spaced apart sufficiently from each other to subject the whole/bonding surfaces to contact uniformly.

2. A method for bonding a plurality of non-magnetic members comprising the steps of:
   (1) mating non-magnetic members via an uncured adhesive interposed between their surfaces to be bonded;
   (2) applying pressure to the mated portions of said non-magnetic members between a pressing magnetic jig and a pressure-receiving, soft-magnetic jig; and
   (3) curing said adhesive while applying pressure, wherein a pair or non-magnetic members are bonded together, and said non-magnetic members are half-cylindrical skin members made of a fiber-reinforced composite material for constituting a fuselage of aircraft so as to reduce the weight of transport vehicles including aircraft, and
   wherein a cushioning member is interposed only on a single side of said mated portions of said non-magnetic members between a pressing surface of said pressing magnet jig and outside surfaces of the mated portions of said non-magnetic members so as to subject the whole bonding surfaces to contacting uniformly with said adhesive sheet,
   wherein an applying pressure for curing is in the range of 0.025 kg/cm$^2$ to 0.08 kg/cm$^2$, and wherein a curing temperature of said adhesive sheet is in a range of 100° C. to 130° C., and a heat resistance temperature of said magnetic is not less than 130° C.

3. The method for bonding a plurality of non-magnetic members according to claim 1, wherein said adhesive is a thermosetting adhesive in the form of a sheet.

4. The method for bonding a plurality of non-magnetic members according to claim 2, wherein said adhesive is a thermosetting adhesive in the form of a sheet.

5. The method for bonding a plurality of non-magnetic members according to claim 1, wherein said pressing magnet jig comprises a handle, a jig body made of a soft-magnetic material, and magnet members.

6. The method for bonding a plurality of non-magnetic members according to claim 2, wherein said pressing magnet jig comprises a handle, a jig body made of a soft-magnetic material, and magnet members.

7. A method for bonding a plurality of non-magnetic members comprising the steps of:
   (1) mating non-magnetic members via an uncured adhesive interposed between their surfaces to be bonded;
   (2) applying pressure to the mated portions of said non-magnetic members between a pressing magnet jig and a pressure-receiving, soft-magnetic jig; and
   (3) curing said adhesive while applying pressure, wherein a cushioning member is interposed only on a single side of said mated portions of said non-magnetic members between a pressing surface of said pressing magnet jig and outside surfaces of the mated portions of said non-magnetic members so as to subject the whole bonding surfaces to contacting uniformly with said adhesive sheet,
   wherein an applying pressure for curing is in the range of 0.025 kg/cm$^2$ to 0.8 k/cm$^2$, and wherein a curing temperature of said adhesive sheet is in a range of 100° C. to 130° C., and a heat resistance temperature of said magnet is not less than 130° C., and wherein said cushioning member comprises two separate parts each interposed on the single side of the mated portions of the non-magnetic member between the pressing surface of the pressing magnetic jig and the outside surfaces of the mated portions of the non-magnetic members, said two separate parts being spaced apart sufficiently from each other to subject the whole bonding surfaces to contact uniformly.

8. The method for bonding a plurality of non-magnetic members according to claim 7, wherein a rate of heating or rate of cooling is a constant rate of 2–4° C./minute.

9. The method for bonding a plurality of non-magnetic members according to claim 1, wherein said cushioning member is a tetrafluorocarbon sheet.

10. The method for bonding a plurality of non-magnetic members according to claim 2, wherein said cushioning member is a tetrafluorocarbon sheet.

11. The method for bonding a plurality of non-magnetic members according to claim 7, wherein said cushioning member is a tetrafluorocarbon sheet.

12. The method of claim 2, wherein said cushioning member comprises two separate parts each interposed on the single side of the mated portions of the non-magnetic member between the pressing surface of the pressing magnetic jig and the outside surfaces of the mated portions of the non-magnetic members, said two separate parts being spaced apart sufficiently from each other to subject the whole bonding surfaces to contact uniformly.

* * * * *